United States Patent
Al-Yami et al.

(10) Patent No.: US 10,703,957 B2
(45) Date of Patent: *Jul. 7, 2020

(54) DEVELOPMENT OF RETARDED ACID SYSTEM

(71) Applicant: Saudi Arabian Oil Company, Dhahran (SA)

(72) Inventors: Abdullah Al-Yami, Dhahran (SA); Vikrant Wagle, Abqaiq (SA); Ali Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,525

(22) Filed: Jul. 19, 2018

(65) Prior Publication Data

US 2018/0320063 A1 Nov. 8, 2018

Related U.S. Application Data

(63) Continuation of application No. 15/581,136, filed on Apr. 28, 2017.

(60) Provisional application No. 62/454,189, filed on Feb. 3, 2017, provisional application No. 62/454,192, filed on Feb. 3, 2017.

(51) Int. Cl.
*C09K 8/24* (2006.01)
*E21B 21/00* (2006.01)
(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01);
(Continued)

(58) Field of Classification Search
CPC ............ C09K 2208/12; C09K 2208/34; C09K 8/032; C09K 8/035; C09K 8/04; C09K 8/08; C09K 8/20; C09K 8/22; C09K 8/28; C09K 8/32; C09K 8/36; C09K 8/40; C09K 8/424; C09K 8/46; C09K 8/467; C09K 8/48; C09K 8/487; C09K 8/506; C09K 8/508; C09K 8/74; E21B 21/00; E21B 21/002; E21B 21/003; E21B 33/14; E21B 43/25; C04B 24/026; C04B 28/04; C04B 18/08; C04B 18/141; C04B 18/146; C04B 24/32; C04B 2103/40; C04B 2103/46; C04B 28/02; C04B 2103/12; C04B 2103/22; C04B 2103/50; C04B 24/08; C04B 14/06; C04B 2111/00068; C04B 2201/20; C04B 24/02; C04B 24/085; C04B 38/02; C04B 7/527; B01F 17/0021; B01F 17/0042; B01F 17/0092; C10M 105/18; C10M 105/62; C10M 107/34; C10M 111/04; C10M 173/02; C10M 2207/003; C10M 2207/046; C10M 2209/1045; C10M 2215/042; C10M 2215/265; C10N 2220/021; C10N 2230/06

See application file for complete search history.

(56) References Cited

U.S. PATENT DOCUMENTS 2,589,949 A 3/1952 Meadors
2,782,163 A 2/1957 Wilson
(Continued)

FOREIGN PATENT DOCUMENTS

CA 2495811 A1 3/2004
CA 2594108 A1 9/2008
(Continued)

OTHER PUBLICATIONS

Office Action dated Feb. 27, 2019 pertaining to U.S. Appl. No. 15/922,077, filed Mar. 15, 2018, 69 pgs.
(Continued)

*Primary Examiner* — Frances Tischler
(74) *Attorney, Agent, or Firm* — Dinsmore & Shohl LLP

(57) ABSTRACT

In one embodiment, a retarded acid system comprises an aqueous acid and a retarding surfactant. The aqueous acid may comprise from 5 wt. % to 25 wt. % of a strong acid, that is, an acid having a $K_a$ greater than or equal to 0.01. The aqueous acid may further comprise from 75 wt. % to 95 wt. % water. The retarding surfactant may have the general chemical formula $R-(OC_2H_4)_x-OH$ where R is a hydrocarbon having from 11 to 15 carbon atoms and x is an integer from 6 to 10. The retarding surfactant may have a hydrophilic-lipophilic balance from 8 to 16.

3 Claims, No Drawings

(51) Int. Cl.

| | | |
|---|---|---|
| C09K 8/22 | (2006.01) | |
| C09K 8/467 | (2006.01) | |
| C10M 173/00 | (2006.01) | |
| C04B 24/02 | (2006.01) | |
| C04B 28/02 | (2006.01) | |
| C04B 28/04 | (2006.01) | |
| C04B 28/08 | (2006.01) | |
| C09K 8/74 | (2006.01) | |
| E21B 43/25 | (2006.01) | |
| C09K 8/03 | (2006.01) | |
| C09K 8/20 | (2006.01) | |
| B01F 17/00 | (2006.01) | |
| C09K 8/40 | (2006.01) | |
| E21B 33/14 | (2006.01) | |
| C09K 8/035 | (2006.01) | |
| C09K 8/08 | (2006.01) | |
| C09K 8/42 | (2006.01) | |
| C09K 8/48 | (2006.01) | |
| C04B 24/08 | (2006.01) | |
| C09K 8/487 | (2006.01) | |
| C04B 7/52 | (2006.01) | |
| C09K 8/46 | (2006.01) | |
| C09K 8/04 | (2006.01) | |
| C04B 14/06 | (2006.01) | |
| C04B 38/02 | (2006.01) | |
| C10M 105/18 | (2006.01) | |
| C10M 105/62 | (2006.01) | |
| C10M 107/34 | (2006.01) | |
| C10M 111/04 | (2006.01) | |
| C09K 8/32 | (2006.01) | |
| C09K 8/36 | (2006.01) | |
| C10M 173/02 | (2006.01) | |
| C04B 103/40 | (2006.01) | |
| C04B 103/46 | (2006.01) | |
| C04B 111/00 | (2006.01) | |

(52) U.S. Cl.
CPC .......... *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin |
| 3,048,538 A | 8/1962 | Rosenberg et al. |
| 3,319,714 A | 5/1967 | Knox |
| 3,353,603 A | 11/1967 | Knight et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel et al. |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow, Jr. |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Barnhorst et al. |
| 5,830,831 A | 11/1998 | Chan et al. |
| 5,850,880 A | 12/1998 | Moran et al. |
| 5,996,693 A | 12/1999 | Heathman |
| 6,063,737 A | 5/2000 | Haberman et al. |
| 6,258,756 B1 | 7/2001 | Hayatdavoudi |
| 6,267,716 B1 | 7/2001 | Quintero |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 10,287,476 B2 | 5/2019 | Al-Yami et al. |
| 10,287,477 B2 | 5/2019 | Al-Yami et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0116304 A1 | 6/2004 | Wu et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |

(56) References Cited

U.S. PATENT DOCUMENTS

| | | |
|---|---|---|
| 2007/0191235 A1 | 8/2007 | Mas et al. |
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van de Peer et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Al-Subhi et al. |
| 2013/0126243 A1 | 5/2013 | Smith |
| 2013/0153232 A1 | 6/2013 | Bobier et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1* | 7/2014 | Smith .................. C09K 8/035 507/136 |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | |
|---|---|---|
| CA | 2810345 A1 | 3/2012 |
| CA | 2495811 C | 5/2012 |
| CA | 2745017 A1 | 12/2012 |
| CA | 2594108 C | 6/2014 |
| CA | 2745017 C | 6/2018 |
| CN | 101240218 A | 8/2008 |
| CN | 102041138 A | 5/2011 |
| CN | 102120158 A | 7/2011 |
| CN | 102041138 B | 12/2011 |
| CN | 102321461 A | 1/2012 |
| CN | 102373042 A | 3/2012 |
| CN | 102373053 A | 3/2012 |
| CN | 102382697 A | 3/2012 |
| CN | 102464974 A | 5/2012 |
| CN | 102500141 A | 6/2012 |
| CN | 102899152 A | 1/2013 |
| CN | 102899154 A | 1/2013 |
| CN | 102977940 A | 3/2013 |
| CN | 102373042 B | 8/2013 |
| CN | 102464974 B | 8/2013 |
| CN | 103320203 A | 9/2013 |
| CN | 103351925 A | 10/2013 |
| CN | 102500141 B | 1/2014 |
| CN | 103555304 A | 2/2014 |
| CN | 103571578 A | 2/2014 |
| CN | 103571599 A | 2/2014 |
| CN | 102899152 B | 4/2014 |
| CN | 102899154 B | 4/2014 |
| CN | 103757640 A | 4/2014 |
| CN | 103773041 A | 5/2014 |
| CN | 102977940 B | 11/2014 |
| CN | 104130839 A | 11/2014 |
| CN | 103571599 B | 2/2015 |
| CN | 104449893 A | 3/2015 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| CN | 104910881 B | 2/2017 |
| CN | 104559954 B | 12/2017 |
| CN | 105112036 B | 8/2018 |
| EP | 108546 A2 | 5/1984 |
| EP | 108546 A3 | 12/1985 |
| EP | 243067 A2 | 10/1987 |
| EP | 108546 B1 | 3/1988 |
| EP | 0265563 A1 | 5/1988 |
| EP | 296655 A1 | 12/1988 |
| EP | 315243 A1 | 5/1989 |
| EP | 331158 A2 | 9/1989 |
| EP | 243067 A3 | 10/1989 |
| EP | 395815 A1 | 11/1990 |
| EP | 331158 A3 | 2/1991 |
| EP | 395815 B1 | 6/1993 |
| EP | 1213270 A1 | 6/2002 |
| EP | 1003829 B1 | 5/2004 |
| EP | 2708586 A1 | 3/2014 |
| GB | 2205748 A | 12/1988 |
| GB | 2205748 B | 11/1990 |
| GB | 2283036 A | 4/1995 |
| GB | 2283036 B | 1/1997 |
| GB | 2343447 A | 5/2000 |
| GB | 2343447 B | 5/2003 |
| JP | 07109472 A | 4/1995 |
| JP | 2006001789 A | 1/2006 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 9836151 A1 | 8/1998 |
| WO | 9907816 A1 | 2/1999 |
| WO | 9907816 A8 | 5/1999 |
| WO | 9955634 A1 | 11/1999 |
| WO | 0123703 A1 | 4/2001 |
| WO | 03093641 A1 | 11/2003 |
| WO | 2004076561 A1 | 9/2004 |
| WO | 2006012622 A2 | 2/2006 |
| WO | 2006120151 A2 | 11/2006 |
| WO | 2007003885 A2 | 1/2007 |
| WO | 2006120151 A3 | 3/2007 |
| WO | 2007003885 A3 | 5/2007 |
| WO | 2007118328 A1 | 10/2007 |

(56) References Cited

FOREIGN PATENT DOCUMENTS

| | | |
|---|---|---|
| WO | 2008081158 A2 | 7/2008 |
| WO | 2009060405 A1 | 5/2009 |
| WO | 2009138383 A1 | 11/2009 |
| WO | 2010030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2013055843 A8 | 8/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015038117 A1 | 3/2015 |
| WO | 2015041649 A1 | 3/2015 |
| WO | 2016189062 A1 | 12/2016 |

OTHER PUBLICATIONS

Notice of Allowance and Fee(s) Due dated Feb. 21, 2019 pertaining to U.S. Appl. No. 15/489,927, filed Apr. 18, 2017, 27 pgs.

Office Action dated Mar. 13, 2019 pertaining to U.S. Appl. No. 15/922,065, filed Mar. 15, 2018, 77 pgs.

Office Action dated Mar. 27, 2019 pertaining to U.S. Appl. No. 15/581,136, filed Apr. 28, 2017, 20 pgs.

Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.

Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.

Inoue et al., "Interactions Between Engine Oil Additive", J. Japan Petrol. Inst., 1981, 24 (2), 101-107.

Joshi et al., "Physiochemical Behaviour of Ternary System Based on Coconut Oil/C12/E8/n-pentanol/Water", J. Surface Sci. Technol., 2013, 29 (1-2), 1-13.

Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.

Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.

Min et al., "Research on Coking Dust Wettability of Strong Cohesiveness and Easy Mudding", Safety in Coal Mines, Tsinghua Tongfang Knowledge Network Technology Co., Ltd., 2006.

Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.

Nelson, Erik B., "Well Cementing Fundamentals", Oilfield Review, Summer 2012, vol. 24, No. 2, 59-60, Schlumberger.

Paswan et al., "Development of Jatropha oil-in-water emulsion drilling mud system", Journal of Petroleum Science and Engineering, 2016, vol. 144, p. 10-18.

Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.

International Search Report and Written Opinion pertaining to International Application No. PCT/US2018/014986 filed Jan. 24, 2018.

International Search Report and Written Opinion pertaining to International Application No. PCT/US2018/015191 filed Jan. 25, 2018.

International Search Report and Written Opinion dated Apr. 3, 2018 Petaining to International Application No. PCT/US2018/016182 pp. 1-13.

Non-Final Office Action dated Jan. 16, 2018 pertaining to U.S. Appl. No. 15/485,479, filed Apr. 12, 2017.

Non-Final Office Action dated Apr. 30, 2018 pertaining to U.S. Appl. No. 15/586,543, filed May 4, 2017.

Non-Final Office Action dated May 1, 2018 pertaining to U.S. Appl. No. 15/496,794, filed Apr. 25, 2017.

International Search Report and Written Opinion dated Apr. 3, 2018, pertaining to International Application PCT/US2018/016447, filed Feb. 1, 2018, 14 pages.

International Search Report and Written Opinion dated Apr. 20, 2018, pertaining to International Application PCT/US2018/016365, filed Feb. 1, 2018, 16 pages.

International Search Report and Written Opinion dated Apr. 20, 2018, pertaining to International Application PCT/US2018/016414, filed Feb. 1, 2018, 14 pages.

International Search Report and Written Opinion dated Apr. 16, 2018, pertaining to International Application PCT/US2018/016415, filed Feb. 1, 2018, 13 pages.

Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jrc_contents/par/tabbedcontent/tab_1780231844/textimage.

Non-Final Office Action dated May 4, 2018 pertaining to U.S. Appl. No. 15/628,892, filed Jun. 21, 2017.

International Search Report and Written Opinion dated May 8, 2018 pertaining to International Application No. PCT/US2018/015631.

International Search Report and Written Opinion dated May 14, 2018 pertaining to International Application No. PCT/US2018/015640 filed Jan. 29, 2018, 16 pages.

International Search Report and Written Opinion dated May 9, 2018 pertaining to International Application No. PCT/US2018/015638 filed Jan. 29, 2018, 15 pages.

Non-Final Office Action dated May 25, 2018 pertaining to U.S. Appl. No. 15/485,724, 6 pages.

International Search Report and Written Opinion dated May 29, 2018 pertaining to International Application No. PCT/US2018/015207 filed Jan. 25, 2018, 15 pages.

International Search Report and Written Opinion dated May 25, 2018, pertaining to International Application No. PCT/US2018/016167, filed Jan. 31, 2018, 20 pages.

Office Action pertaining to U.S. Appl. No. 15/489,927 dated Jul. 6, 2018.

Office Action pertaining to U.S. Appl. No. 16/002,672 dated Sep. 14, 2018.

Office Action pertaining to. U.S. Appl. No. 16/002,669 dated Sep. 21, 2018.

Final Rejection dated Oct. 9, 2018 pertaining to U.S. Appl. No. 15/496,794.

Sabicol Ta Series Synthetic Alcohol Ethoxylates, SGS, 2013, pp. 1-3, retrieved Sep. 28, 2018 from http://www.latro.com.tr/upload/1499842623-t2.pdf (Year:2013).

Notice of Allowance and Fee(s) Due dated May 15, 2019 pertaining to U.S. Appl. No. 15/922,077, filed Mar. 15, 2018, 27 pgs.

U.S. Office Action dated Apr. 11, 2019 pertaining to U.S. Appl. No. 15/628,892, filed Jun. 21, 2017, 34 pgs.

U.S. Notice of Allowance dated Apr. 24, 2019 pertaining to U.S. Appl. No. 15/485,724, filed Apr. 12, 2017, 23 pgs.

U.S. Notice of Allowance dated Apr. 26, 2019 pertaining to U.S. Appl. No. 15/489,930, filed Apr. 18, 2017, 14 pgs.

Office Action dated Dec. 12, 2018 pertaining to U.S. Appl. No. 15/581,136, filed Apr. 28, 2017.

Office Action dated Dec. 19, 2018 pertaining to U.S. Appl. No. 15/489,930, filed Apr. 18, 2017.

Notice of Allowance and Fee(s) Due dated Jan. 8, 2019 pertaining to U.S. Appl. No. 15/485,479, filed Apr. 12, 2017.

Office Action dated Jan. 17, 2019 pertaining to U.S. Appl. No. 15/485,724, filed Apr. 12, 2017.

(56) References Cited

OTHER PUBLICATIONS

Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 38 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs,
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for Application No. 3,052,276 dated Sep. 5, 2019.
Examination Report for Application No. GC2018-34699 dated Aug. 21, 2019.
Examination Report for Application No. GC2018-34711 dated Jul. 28, 2019.
Examination Report for Application No. GC2018-34700 dated Aug. 21, 2019.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 15/586,555, filed May 4, 2017, 92 pgs.
"Tridecyl Alcohol Ethoxylate," 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Notice of Allowance and Fee(s) Due dated Oct. 11, 2019 pertaining to U.S. Appl. No. 16/037,493, filed Jul. 17, 2018, 17 pgs.
Notice of Allowance and Fee(s) Due dated Oct. 2, 2019 pertaining to U.S. Appl. No. 15/489,854, filed Apr. 18, 2017, 13 pgs.
International Preliminary Report on Patentability for Application No. PCT/US2018/016415 dated Aug. 15, 2019.
Examination Report pertaining to Application No. GC 2018-34707 dated Dec. 17, 2019.
Notice of Allowance and Fee(s) Due dated Nov. 5, 2019 pertaining to U.S. Appl. No. 15/586,555, filed May 4, 2017, 29 pg.
Office Action dated Oct. 23, 2019 pertaining to U.S. Appl. No. 15/660,118, filed Jul. 26, 2017, 45 pgs.
Office Action dated Oct. 24, 2019 pertaining to U.S. Appl. No. 16/202,600, filed Nov. 28, 2018, 84 pgs.
Nelson, E.B. Well cementing, vol. 28, pp. 5-25 through 5-34, ISBN 0-444-88751-2 (Year: 1990).
Office Action dated Dec. 5, 2019 pertaining to U.S. Appl. No. 15/496,794, filed Apr. 25, 2017, 34 pgs.
Office Action dated Dec. 13, 2019 pertaining to U.S. Appl. No. 15/586,543, filed May 4, 2017, 27 pgs.
Office Action dated Dec. 19, 2019 pertaining to U.S. Appl. No. 15/612,397, filed Jun. 2, 2017, 34 pgs.
Office Action dated Dec. 13, 2019 pertaining to U.S. Appl. No. 15/581,136, filed Apr. 28, 2017, 33 pgs.
Notice of Allowance and Fee(s) Due dated Jan. 17, 2020 pertaining to U.S. Appl. No. 15/660,118, filed Jul. 26, 2017, 10 pgs.
Notice of Allowance and Fee(s) Due dated Jan. 9, 2020 pertaining to U.S. Appl. No. 16/002,669, filed Jun. 7, 2018, 35 pgs.
Examination Report for Application No. GC2018-34705 dated Oct. 27, 2019.

* cited by examiner

DEVELOPMENT OF RETARDED ACID SYSTEM

CROSS-REFERENCE TO RELATED APPLICATIONS

This application is a Continuation application of U.S. patent application Ser. No. 15/581,136 filed Apr. 28, 2017, which claims priority to U.S. Provisional Patent Application Ser. No. 62/454,189 filed Feb. 3, 2017 and U.S. Provisional Patent Application Ser. No. 62/454,192 filed Feb. 3, 2017, all of which are incorporated by reference herein in their entirety.

TECHNICAL FIELD

Embodiments of the present disclosure generally relate to acid systems and methods of using the acid systems. More specifically, embodiments of the present disclosure relate to retarded acid systems and methods for the use of retarded acid systems in acidizing geologic carbonate formations.

BACKGROUND

In oil and gas drilling, wellbore stimulation is a common treatment performed in subterranean formations to enhance or restore the productivity of oil and gas from a wellbore. Acid treatments, as detailed infra, may be used for wellbore stimulation. Acidizing is a stimulation acid treatment technique in which a treatment fluid comprising aqueous acid solution is delivered into the subterranean formation to dissolve acid-soluble materials, such as carbonates. In a functioning wellbore, channels in the surrounding formation carry gas and oil from the formation to the wellbore. Carbonate formations can block or obstruct these channels. Acidic solutions may be utilized to acidize the carbonate formations and improve the productivity of the wellbore. These carbonate formations may impact the productivity of a wellbore. This can increase the permeability of a treatment zone and enhance well production by increasing the effective wellbore radius.

Standard hydrochloric acid reacts very quickly in carbonate formations. The reaction is so rapid in high temperatures that it is impossible for acid to penetrate, or wormhole, more than a few inches into the formation. In such cases, the acid is rendered ineffective in stimulating the wellbore.

SUMMARY

Accordingly, ongoing needs exist for improved retarding acid formulations, which slow the acid reaction rate to allow for deeper wellbore penetration by acidizing stimulation.

Embodiments of the present disclosure are directed to retarded acid formulations comprising natural or synthetic alcohol ethoxylates which function as retarding surfactants. Specifically, alcohol ethoxylate embodiments with a hydrophilic-lipophilic balance (HLB) value from 8 to 16 may be used retard the reaction rate of acids with carbonates. Moreover, the alcohol ethoxylates may be used as emulsifier in an emulsified retarded acid formulation, for example, an invert emulsion. In addition to retarding acid reaction rates, these alcohol ethoxylates provide improved stability.

In one embodiment, a retarded acid system comprises an aqueous acid and a retarding surfactant. The aqueous acid may comprise from 5 wt. % to 25 wt. % of a strong acid, that is, an acid having a $K_a$ greater than or equal to 0.01. The aqueous acid may further comprise from 75 wt. % to 95 wt. % water. The retarding surfactant may have the general chemical formula $R-(OC_2H_4)_X-OH$, where R is a hydrocarbon having from 11 to 15 carbon atoms and x is an integer from 6 to 10. The retarding surfactant may have a hydrophilic-lipophilic balance from 8 to 16.

In another embodiment, a retarded acid emulsion comprises an aqueous acid, a base oil, and a retarding surfactant. The aqueous acid may comprise from 5 wt. % to 25 wt. % of a strong acid, that is, an acid having a $K_a$ greater than or equal to 0.01. The aqueous acid may further comprise from 75 wt. % to 95 wt. % water. The retarding surfactant may have the general formula $R-(OC_2H_4)_X-OH$, where R is a hydrocarbon having from 11 to 15 carbon atoms and x is an integer from 1 to 4. The retarding surfactant may have a hydrophilic-lipophilic balance from 3 to 7.

In another embodiment, a method for acidizing a carbonate formation comprises adding a retarded acid system to the carbonate formation, dissolving at least some of the carbonate formation with the retarded acid system, and acidizing the carbonate formation. Alternatively, in another embodiment, a method for acidizing a carbonate formation may comprise adding a retarded acid emulsion to a carbonate formation, dissolving at least some of the carbonate formation with the retarded acid emulsion, and acidizing the carbonate formation.

DETAILED DESCRIPTION

Embodiments of the present disclosure are directed to retarded acid formulations used for acidizing stimulation in a wellbores. In one embodiment, the retarded acid formulation, which may be non-emulsive, comprises an aqueous acid, wherein the aqueous acid comprises from 5 wt. % to 25 wt. % of strong acid having a $K_a$ greater than or equal to 0.01. The retarded acid system comprises from 75 wt. % to 95 wt. % water; and a retarding surfactant. The retarding surfactant has the chemical formula $R-(OC_2H_4)_X-OH$, where R is a hydrocarbon having from 11 to 15 carbon atoms; x is an integer from 6 to 10; and the retarding surfactant has a hydrophilic-lipophilic balance from 8 to 16. Further embodiments are directed to retarded acid emulsion comprising the aqueous, a base oil, and the retarding surfactant which acts as an emulsifier. Like the retarded acid system, the retarding surfactant has the structure of $R-(OC_2H_4)_X-OH$, where R is a hydrocarbon having from 11 to 15 carbon atoms. However, when used as an emulsifier, the retarding surfactant has an x value from 1 to 4, and a hydrophilic-lipophilic balance from 3 to 7.

As further background, a wellbore is formed by inserting a drill string into a previously drilled hole. The drill string may comprise a drill bit and drill collars. The drill string may then be rotated about an annular axis causing the drill bit to cut into the surrounding formation and thereby expanding the hole. The surrounding formation may vary in composition and may include rock, dirt, sand, stone, or combinations thereof.

The wellbore is generally drilled in proximity to a target oil or gas formation. Channels in the formation surrounding the wellbore allow for the target oil or gas to flow from the formation to the wellbore. This flowing of target oil or gas to the wellbore enables the extraction of the target oil or gas through the wellbore.

During drilling operations, geologic carbonate formations may be present near or around the desired oil or gas bearing formations and wellbore. These carbonate formations can negatively impact the productivity of a wellbore. To mitigate the impact these carbonate formations have on the productivity of the wellbore, the wellbores may be treated with acidic formulations.

Over time, the production of a wellbore may decrease. This may be due to several factors including, but not limited to, obstructions in the wellbore, decreased permeability of the surrounding formation, or damage to the wellbore from drilling or extraction procedures. There are many potential obstructions that may present in the wellbore. For example, when drilling muds filter into the surrounding formation they can obstruct the channels through which target oil or gas fluids flow. Alternatively, the water injection may also lead to obstructions in the wellbore. The injected water or other aqueous solutions may have particles of size sufficient to obstruct the channels in the formation.

These obstructions may decrease wellbore productivity, a general measure of how much target oil or gas can be extracted from a wellbore. Wellbore productivity may be measured by the pressure at which the target formation flows through the wellbore. Alternatively, wellbore productivity may be quantified by the total mass of target fluid extracted through the wellbore.

Drilling and extraction procedures may affect the surrounding formation. These procedures can cause shifts in the constituent materials of the formation and lead to decreased wellbore productivity. For example, drilling into the formation can cause sandstone or carbonate formations to shift and obstruct channels that carry target fluids to the wellbore. Alternatively, carbonates and other solids may precipitate out of drilling muds, workover fluids, or other solutions used in the drilling and extraction process. These solids can obstruct channels that facilitate the flow of target fluids and decrease wellbore productivity.

The purpose of any acid treatment is to improve wellbore productivity. There are three general categories of acid treatments: acid washing, acid fracturing, and acidizing. The type of treatment used generally depends on the formation composition and formation permeability. The formation composition may comprise carbonate, sand, shale, sandstone, other geologic formations, or combinations thereof. The formation permeability is the ability of a fluid to flow through the formation in its natural state.

Acid washing is primarily used to clean the wellbore from rust and other debris that restrict flow in the wellbore. In acid washing, the acid is not intended to permeate the surrounding formation. The purpose of acid fracturing or acidizing a wellbore is to restore or improve wellbore productivity by dissolving material that is restricting flow. The requisite pumping pressure required to add the acid treatment fluid to the formation is determined by the formation permeability. In general, the less permeable the formation, the greater the pumping pressure. In formations with greater permeability, the acid treatment fluid can be pumped into the formation at relatively small pumping pressures.

In acid fracturing, acid is pumped into the wellbore at a pressure greater than fracturing pressure. Due to the extreme pressures involved, it is often difficult to control and direct the flow of the acid. The acid may filter into non-target formations, and it is not always an efficient means of improving wellbore production. However, in less permeable formations, acid fracturing was historically the only way to disrupt obstructions and improve wellbore productivity.

Acidizing involves adding acid into a wellbore at a pressure less than fracturing pressure. Because acidizing occurs at a pressure less than the corresponding acid fracturing pressure, it is generally easier to control and direct the flow of the acid in an efficient manner. The problem with this type of acid treatment, using conventional acids, is that the acid reacts with the carbonate too quickly and cannot permeate, or wormhole, into less permeable formations. The acid systems and emulsions of the present disclosure solve this problem with the addition of a retarding surfactant that can reduce the rate of reaction and enable the acid to wormhole into the formation. The retarded acid systems and retarded acid emulsions of the present disclosure allow for acidizing at a relatively small pressure.

During acidizing operations, the acid is generally chemically consumed and neutralized as the target formation is dissolved. For a general acid, HA (with conjugate anion, A−), reacting with a general carbonate, $MCO_3$, this reaction proceeds according to Equation 1:

$$HA_{(aq)} + MCO_{3(s)} \rightarrow M_{(aq)}^+ + A_{(aq)}^- + H_2O_{(l)} + CO_{2(g)} \qquad \text{Eq. (1)}$$

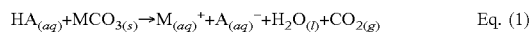

As is apparent from the chemical equation, the carbonate is dissolved into the aqueous acid solution and carbon dioxide is evolved. This reaction generally occurs instantaneously and proceeds to completion quickly. Upon addition of a retarding surfactant, this reaction occurs at a slower rate, enabling the acidizing solution to wormhole further into the carbonate formation.

Acid strength is characterized by how well a particular acid dissociates and donates protons. A stronger acid is an acid that dissociates at a frequent rate and donates a comparatively greater concentration of protons. A weaker acid does not donate protons as well because it dissociates at a less frequent rate, resulting in a comparatively lesser concentration of protons. Acid strength can be quantified by the acid dissociation constant, $K_a$. The $K_a$ of an acid may be defined as the concentration of conjugate anions multiplied by concentration of donated protons, divided by the concentration of undissociated acid. A strong acid has a $K_a$ greater than or equal to 0.01. Strong acids are favorable for acidizing operations because they dissociate at a frequent rate, resulting in a more complete reaction and less unreacted acid remaining in the formation.

Two substances cannot undergo a chemical reaction unless the constituent molecules, ions, or atoms come into contact. As a consequence, the more reactant particles that collide with each other per unit time, the faster the reaction will proceed. Therefore, the rate at which a chemical reaction proceeds may be affected by reactant concentrations, temperature, physical states and surface areas of reactants, and properties of non-reacting compounds in the reaction solution. All of these factors can affect the collision rate of reactants. A retarded acid is some type of acid formulation that reacts at a slower rate than the pure acid alone would react. A retarded acid may generally comprise any substance or condition that decreases the collision rate of acid molecules and ions with other reactant molecules or ions.

Other than the addition of a retarding surfactant, there are other additives that can effectively slow the rate of the reaction of strong acids and carbonates. For example, the addition of a viscous non-reactive pad prior to acidizing can retard the rate of reaction. These viscous pads may comprise weaker acids foamed with nonpolymer surfactants and non-reactive gases. Example weaker acids used in viscous pad include monoaminopolycarboxylic acids, polyaminopolycarboxylic acids, and esters thereof. The viscous pad cools the formation and decreases the amount of reactive surface area exposed to the acidizing fluid. However, these viscous pads are largely ineffective because their effect on the reaction rate of the acid is minimal and the viscous pads often have trouble adhering to the formation surface.

Additional additives to acidizing fluids such as alkyl sulfonates, alkyl phosphonates, or alkyl amines can form a hydrophobic coating on the carbonate formation surface and retard the rate of reaction. These additives also have a minimal effect on the reaction rate of the acid and must be consistently reapplied during the acidizing process.

In contrast to the viscous pad method of acid retardation, where a viscous fluid is added and then acid is applied; some viscoelastic fluids can be formulated where the acid is incorporated into the viscous fluid. These systems usually comprise, in addition to an aqueous acid solution, a viscoelastic surfactant package. The viscoelastic surfactant package can be a mixture of nonionic surfactants, hydrotropic surfactants, and at least one hydrophobic organic alcohol. Due to the high viscosity of these formulations they may increase the stress on drilling equipment and increase frictional stress on the drilling system in fluid conduit. These problems can decrease the lifetime of the drilling equipment and destabilize the wellbore.

In contrast to viscoelastic fluids, embodiments of the present disclosure comprise a retarding surfactant. The presence of the retarding surfactant enables the beneficial properties of viscoelastic fluids without the need for hydrotropic surfactants or hydrophobic organic alcohols. Examples of hydrophobic organic alcohols include, but are not limited to, diethanol, propanol alcohol ethers, ethylbenzyl alcohol, 2-propanol, 1-octanol, 2-ethyl-1-hexanol, and mixtures thereof.

Another method of slowing the rate of reaction includes coating the carbonate formation surface with a carbon dioxide foam. The addition of a foaming agent to the acidizing solution in combination with the carbon dioxide produced by the reaction of the acid and the carbonate formation creates a carbon dioxide foam that coats the carbonate surface and retards the rate of reaction. These foams are often unstable and can break under certain critical pressures or temperatures, leading to an ineffective coating of the carbonate formation.

Another method of slowing down the rate of reaction is to add a weaker acid such as acetic acid ($CH_3CO_2H$) or formic acid ($CHO_2H$) to the acidizing fluid. These acids can decrease the rate of reaction, but they also leave unspent acid in the formation because weaker acids do not dissociate as well—and thereby do not react as completely—as strong acids. Unspent acid in the formation is undesirable because it may affect the quality of target oil or gas fluids extracted.

Another method of slowing down the rate of reaction is to create a gelled acid. Gelled acids can be formed with nitrogen to generate a stable gel with increased viscosity. In gelled acids, the increased viscosity is supposed to retard the reaction. However, experimental data shows that in some conditions the increased viscosity can actually accelerate the reaction rate. Without being limited by theory, it is believed this happens because the more viscous fluid can carry a greater concentration of reaction products away from the reaction site and allow for increased reactant molecule, ion, and atom collisions.

In summary, currently available retarded acid systems are minimally effective, require constant reapplication and may leave undesirable reactants in the formation and impair the quality of target oil and gas fluids. Further, the majority of currently available acid retarding agents are not compatible with all potential acidizing acids, limiting their versatility and universality of their application. It should also be noted that the retarded acid systems and emulsions of the present disclosure are able to achieve a slower reaction rate without a viscoelastic surfactant package. As described previously, viscoelastic surfactant packages can cause damage to the drilling equipment and wellbore.

The composition of fluids and systems for acidizing varies based on the composition of the formation. When acidizing carbonate formations, the target is to dissolve the carbonate based materials to create new or clean existing pathways or channels that allow the hydrocarbon fluids to flow to the wellbore. Acids for carbonate formations may contain a strong acid, that is, an inorganic or organic acid having an acid dissociation constant ($K_a$) greater than or equal to 0.01, as these acids exhibit the best reactivity with carbonate compounds. Acids with a $K_a$ less than 0.01 have a decreased frequency of dissociation and will not react as completely or efficiently as the stronger acid. Non-limiting examples of acids with a $K_a$ greater than or equal to 0.01 include perchloric acid ($HClO_4$), chloric acid ($HClO_3$), hydrochloric acid ($HCl$), hydrobromic acid ($HBr$), hydroiodic acid ($HI$), nitric acid ($HNO_3$), oxalic acid ($HO_2C_2O_2H$), sulfuric acid ($H_2SO_4$), and sulfurous acid ($H_2SO_3$). HCl is most commonly used because it has a large acid dissociation constant, it is relatively safe to operate, and it is cost effective.

In some retarded acid system embodiments, the strong acid with a $K_a$ greater than or equal to 0.01 is an inorganic acid. In other embodiments, the strong acid with a $K_a$ greater than or equal to 0.01 is an organic acid. In some embodiments, the retarded acid system may further comprise hydrofluoric acid.

In sand or sandstone formations, hydrofluoric acid (HF) may be used to dissolve quartz, clay, or other silicates obstructing the wellbore. Although hydrofluoric acid has a $K_a$ less than 0.01, it is a proton donor as well as a fluoride donor. This property enables it to dissolve silicates better than stronger acids. Geologic formations are rarely completely homogenous, so some systems, fluids, or emulsions for acidizing may comprise a mixture of different acids to dissolve multiple formation compositions.

In one embodiment, a retarded acid system comprises an aqueous acid and a retarding surfactant. The aqueous acid may comprise a strong acid, that is, an acid having a $K_a$ greater than or equal to 0.01. The aqueous acid may further comprise water. The retarding surfactant may be an alcohol ethoxylate having the general chemical formula R—$(OC_2H_4)_x$—OH. Without being limited by theory, it is believed alcohol ethoxylate retarding surfactants of this general formula can sequester the acid molecules and ions and decrease the collision rate of the acid ions and the carbonate.

In one embodiment, the aqueous acid comprises from 5 wt. % to 25 wt. % of a strong acid, that is an acid having a $K_a$ greater than or equal to 0.01. Without being limited by theory, it is believed that this is the optimal range of concentration of acid efficient sequestration by the retarding surfactant. An acid concentration that is too high will react too quickly and will not be effectively retarded by the surfactant. However, an aqueous acid concentration that is too low will not effectively acidize the carbonate formation.

In other embodiments, the aqueous acid comprises from 2 wt. % to 40 wt. %, from 2 wt. % to 35 wt. %, from 2 wt. % to 30 wt. %, from 2 wt. % to 25 wt. %, from 2 wt. % to 20 wt. %, from 5 wt. % to 40 wt. %, from 5 wt. % to 35 wt. %, from 5 wt. % to 30 wt. %, from 5 wt. % to 20 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, from 15 wt. % to 40 wt. %, from 15 wt. % to 35 wt. %, from 15 wt. % to 30 wt. %, from 15 wt. % to 25 wt. %, from 15 wt. % to 20 wt. %, from 20 wt. % to 40 wt. %, from 20 wt. % to 35 wt. %, from 20 wt. % to 30 wt. %, from 20 wt. % to 25 wt. %, or even from 25 wt. % to 30 wt. % of a strong acid.

In one embodiment, the aqueous acid comprises from 75 wt. % to 95 wt. % water. As used in the present disclosure, water is understood to mean fresh water, sea water, ground water, brine water, distilled water, deionized water, spring water, other aqueous solutions, or combinations thereof. In other embodiments, the aqueous acid comprises from 60 wt. % to 98 wt. %, from 60 wt. % to 95 wt. %, from 60 wt. % to 90 wt. %, from 60 wt. % to 85 wt. %, from 65 wt. % to 98 wt. %, from 65 wt. % to 95 wt. %, from 65 wt. % to 90 wt. %, from 65 wt. % to 85 wt. %, from 70 wt. % to 98 wt. %, from 70 wt. % to 95 wt. %, from 70 wt. % to 90 wt. %, from 70 wt. % to 85 wt. %, from 75 wt. % to 98 wt. %, from 75 wt. % to 90 wt. %, from 75 wt. % to 85 wt. %, from 80 wt. % to 98 wt. %, from 80 wt. % to 95 wt. %, from 80 wt. % to 90 wt. %, from 80 wt. % to 85 wt. %, from 85 wt. % to 98 wt. %, from 85 wt. % to 95 wt. %, from 85 wt. % to 90 wt. %, from 90 wt. % to 98 wt. %, or even from 90 wt. % to 95 wt. % water.

In at least one retarded acid system embodiment, the retarding surfactant has the chemical formula R—(OC$_2$H$_4$)$_x$—OH where R is a saturated, unsaturated, linear, branched, or aromatic hydrocarbon group having from 11 to 15 carbon atoms and x is an integer from 6 to 10. Retarding surfactants of this composition have a hydrophobic-lipophilic balance to enable ideal sequestration of the reactant ions and allow maximum wormholing of the retarded acid.

In other retarded acid system embodiments, R can be a saturated, unsaturated, linear, branched, or aromatic hydrocarbon group having from 12 to 14 carbon atoms, from 12 to 15 carbon atoms, from 11 to 14 carbon atoms, from 11 to 13 carbon atoms, or even from 13 to 15 carbon atoms. In other embodiments, x may be 6, 7, 8, 9, or 10.

The ethoxylation of a fatty alcohol, R—OH, to form the ethoxylated fatty alcohol retarding surfactant proceeds according to Equation 2:

$$\text{ROH} + x\text{C}_2\text{H}_4\text{O} \xrightarrow{\text{KOH}} \text{R(OC}_2\text{H}_4)_x\text{OH} \qquad \text{Eq. (2)}$$

where the fatty alcohol is reacted with x moles of ethylene oxide to produce a fatty alcohol retarding surfactant with the general formula R—(OC$_2$H$_4$)$_x$—OH.

The retarding surfactants of the present disclosure are the condensation products of an ethoxylation reaction of a fatty alcohol. The fatty alcohol is an alcohol having a formula R—OH, where R is a saturated, unsaturated, linear, branched, or aromatic hydrocarbon group having from 11 to 15 carbon atoms. In other embodiments, R can be a saturated, unsaturated, linear, branched, or aromatic hydrocarbon group having from 12 to 14 carbon atoms, from 12 to 15 carbon atoms, from 11 to 14 carbon atoms, from 11 to 13 carbon atoms, or even from 13 to 15 carbon atoms. In at least one embodiment, R is a branched iso tridecyl group.

In some embodiments, the fatty alcohol may be a naturally occurring fatty alcohol, such as fatty alcohols obtained from natural sources such as animal products or vegetable oils. Non-limiting examples of naturally occurring fatty alcohols include, but are not limited to, capric alcohol, decyl alcohol, lauryl alcohol, myristyl alcohol, cetyl alcohol, stearyl alcohol, palmitoeyl alcohol, heptadecanol, nonadecyl alcohol, arachidyl alcohol, other naturally-occurring fatty alcohols, or combinations thereof.

In other embodiments, the fatty alcohol may be a synthetic fatty alcohol prepared from a synthesis reaction using one or more petroleum based precursors. For example, one embodiment may use the oligomerization of ethylene to produce a fatty alcohol having a formula R—OH where R is a saturated, unsaturated, linear, branched, or aromatic hydrocarbon group having from 11 to 15 carbon atoms.

An additional important property of the retarding surfactant is the hydrophilic-lipophilic balance (HLB) value of the molecule. The HLB value of a molecule is a measure of the degree to which it is hydrophilic or lipophilic. HLB value is calculated by the Griffin Method according to Equation 3:

$$HLB = 20 * \frac{M_h}{M} \qquad \text{Eq. (3)}$$

where $M_h$ is the molecular mass of the hydrophilic portion of the molecule and M is the molecular mass of the whole molecule. HLB values calculated using the Griffin Method range from 0 to 20 in which a value of 0 indicates an absolutely hydrophobic/lipophilic molecule and a value of 20 corresponds to an absolutely hydrophilic/lipophobic molecule. Generally, molecules having an HLB less than 10 are lipid soluble, molecules having an HLB great than 10 are water soluble, and molecules with an HLB between 3 and 16 have some surfactant or emulsifying properties.

In some retarded acid system embodiments, the retarding surfactant has an HLB value from 8 to 16. This is the hydrophilic-lipophilic balance that allows for ideal sequestration of acid ions and enable maximum wormholing of the retarded acid system. In other embodiments, the retarding surfactant has an HLB value from 8 to 16, from 9 to 15, from 10 to 14, from 8 to 13, from 10 to 13, from 11 to 16, from 11 to 14, or even from 11 to 13.

In at least one embodiment, the ratio of the weight of the retarding surfactant in the retarded acid system to the weight of the aqueous acid in the retarded acid system—also known as the weight ratio—is from 1:25 to 1:5. Based on the acid concentration and retarding surfactant structures described supra, this ratio range provides for ideal sequestration of the acid ions thereby enabling a reaction rate for maximum wormholing. In other embodiments, the weight ratio is from 1:25 to 1:20, from 1:20 to 1:15, from 1:20 to 1:10, from 1:25 to 1:15, from 1:20 to 1:10, from 1:25 to 1:10, from 1:15 to 1:5, from 1:15 to 1:10, or even from 1:10 to 1:5.

In at least one embodiment, a method for acidizing a carbonate formation comprises adding a retarded acid system to a carbonate formation, dissolving at least some of the carbonate formation, acidizing the carbonate formation.

In embodiments, the retarded acid system is added to the carbonate formation by being pumped through the wellbore. In other embodiments, the retarded acid system may be added through other holes drilled into the formation. The retarded acid system dissolves at least part of the carbonate formation according to Equation 1. When the retarded acid system is added to the carbonate formation and some of the carbonate formation is dissolved, the carbonate formation has been acidized.

Another method of slowing down the rate of reaction is the emulsification of an acid. By using an oil based fluid and a surfactant, the acid can be emulsified within an oil external phase. Without being limited by theory, the emulsification of the acid within the oil may decrease its collision rate with carbonates. If the emulsifying surfactant is also a retarding surfactant, the effect on the rate of reaction is synergistically enhanced.

In at least one embodiment, a retarded acid emulsion comprises an aqueous acid, a base oil, and a retarding surfactant. The aqueous acid may comprise a strong acid, that is, an acid having a $K_a$ greater than or equal to 0.01. The aqueous acid may further comprise water. The retarding surfactant may be an alcohol ethoxylate having the general chemical formula R—$(OC_2H_4)_x$—OH. Without being limited by theory, it is believed that the oil, aqueous acid, and retarding surfactant form an invert emulsion that sequesters the acid ions and lowers their collision rate with carbonate.

In at least one retarded acid emulsion embodiment, the retarding surfactant has the chemical formula R—$(OC_2H_4)_x$—OH where R is a saturated, unsaturated, linear, branched, or aromatic hydrocarbon group having from 11 to 15 carbon atoms and x is an integer from 1 to 4. Retarding surfactants of this composition have a hydrophobic-lipophilic balance to emulsify the aqueous acid within the external oil phase and retain enough hydrophilic character to enable the sequestration of the reactant ions and allow maximum wormholing of the retarded acid.

In other retarded acid system embodiments, R can be a saturated, unsaturated, linear, branched, or aromatic hydrocarbon group having from 12 to 14 carbon atoms, from 12 to 15 carbon atoms, from 11 to 14 carbon atoms, from 11 to 13 carbon atoms, or even from 13 to 15 carbon atoms. In other embodiments, x may be 1, 2, 3, or 4.

In one or more embodiments, the base oil forms an external phase in which the aqueous acid is dispersed. Without being limited by theory, it is believed that the aqueous acid is statistically evenly dispersed within the external phase base oil. The base oil may comprise mineral oil, safra oil, diesel, $C_{12}$-$C_{20}$ linear alpha olefins, paraffin oil, ben oil, marula oil, castor oil, palm oil, copra oil, jojoba oil, tung oil, other oils naturally derived from plants or animals, or combinations thereof.

In at least one retarded acid emulsion embodiment, the retarding surfactant has an HLB value from 3 to 7. Surfactants with an HLB in this range function as emulsifying agents in reverse emulsion but still retain enough hydrophilic character to sequester the acid ions and provide a synergistic effect in the retarded acid emulsion. In other retarded acid emulsion embodiments, the retarding surfactant as an HLB value from 4 to 6, from 3 to 6, or even, from 4 to 7, from 4 to 6, from 3 to 6, or even, from 4 to 7.

In some retarded acid emulsion embodiments, the strong acid with a $K_a$ greater than or equal to 0.01 is an inorganic acid. In other embodiments, the strong acid with a $K_a$ greater than or equal to 0.01 is an organic acid. In some embodiments, the retarded acid emulsion may further comprise hydrofluoric acid.

In at least one embodiment, the ratio of the weight of the retarding surfactant in the retarded acid emulsion to the weight of the aqueous acid in the retarded acid system—also known as the weight ratio—is from 1:50 to 1:8. This is a different ratio from the retarded acid system embodiments, because of the character of an invert emulsion and the different HLB values of the retarding surfactants used in the retarded acid emulsion. For a retarded acid emulsions and their associated retarding surfactants, this ratio provides for ideal acid ion sequestration and maximum wormholing. In other embodiments, the weight ratio is from 1:40 to 1:8, from 1:25 to 1:8, from 1:50 to 1:15, from 1:50 to 1:25, from 1:40 to 1:15, from 1:40 to 1:25, from 1:25 to 1:15, from 1:30 to 1:8, or even from 1:30 to 1:15.

In at least one embodiment, a method for acidizing a carbonate formation comprises adding a retarded acid emulsion to a carbonate formation, dissolving at least some of the carbonate formation, acidizing the carbonate formation.

In embodiments, the retarded acid emulsion is added to the carbonate formation by being pumped through the wellbore. In other embodiments, the retarded acid emulsion may be added through other holes drilled into the formation. The retarded acid emulsion dissolves at least part of the carbonate formation according to Equation 1. When the retarded acid emulsion is added to the carbonate formation and some of the carbonate formation is dissolved, the carbonate formation has been acidized.

EXAMPLES

The following examples illustrate one or more additional features of the present disclosure described supra. It should be understood that these examples are not intended to limit the scope of the disclosure or the appended claims in any manner.

In the following examples, a retarded acid system (Example 1) and a retarded acid emulsion (Example 2) of the present disclosure are described. As a comparative example, an aqueous acid was prepared free of retarding surfactant (Comparative Example).

Comparative Example

For the Comparative Example, 0.5 g of $CaCO_3$ was mixed with 15% w/w HCl acid, and this resulted in instant reaction with continuous release of bubbles. The presence of bubbles demonstrated that $CaCO_3$ has reacted with HCl acid to give $CaCl_2$ and $CO_2$ gas.

Example 1

For Example 1, a retarding surfactant comprising ethylene oxide condensate of synthetic branched isodecyl alcohol was added to 15% HCl acid to give a homogeneous solution. Next, 0.5 g of $CaCO_3$ was subsequently added to this solution. No reaction occurred after 2 minutes, and then was no release of bubbles or $CO_2$ gas was observed 5 minutes after the addition of $CaCO_3$ to the solution containing HCl acid and alcohol ethoxylate. The absence of any bubbles or $CO_2$ gas shows that the alcohol ethoxylate was able to prevent or retard the reaction of calcium carbonate with HCl acid.

Example 2

For example 2, a retarded acid system was prepared with 15 wt. % HCl and a retarding surfactant, $C_{12}H_{25}(OCH_2CH_2)$OH (HLB 4.8). The 15 wt. % HCl solution was prepared by adding concentrated HCl to distilled water in a 3:17 weight ratio. Then, 50 mL of the 15 wt. % HCl was placed in a beaker. Next, 4 mL of the retarding surfactant was added to the 15 wt. % HCl and mixed for 5 minutes. The emulsion was kept overnight for 16 hours to check for oil separation. After 16 hours, the emulsion was stable with no oil separation.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should also be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure. Rather, the claims appended infra should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claim subject matter. Therefore, it is intended that the specification cover the modifications and variations of the various described embodiments provided such modification and variations come within the scope of the appended claims and their equivalents.

The invention claimed is:

1. A retarded acid system comprising:
an aqueous acid;
the aqueous acid comprising:
from 5 wt. % to 35 wt. % of one or more of HF, $HClO_4$, $HClO_3$, HCl, HBr, HI, $HNO_3$, $HO_2C_2O_2H$, $H_2SO_4$, and $H_2SO_3$; and
from 65 wt. % to 95 wt. % water; and
a retarding surfactant;
the retarding surfactant having the chemical formula R—$(OC_2H_4)_X$—OH, where:
R is a hydrocarbon having from 11 to 15 carbon atoms;
x is an integer from 6 to 10; and
the retarding surfactant has a hydrophilic-lipophilic balance from greater than 10 to 16;
where the ratio of the weight of retarding surfactant in the retarded acid system to the weight of the aqueous acid in the retarded acid system is from 1:25 to 1:5.

2. The retarded acid system of claim 1, where R is a hydrocarbon having 13 carbon atoms and x is 8.

3. The retarded acid system of claim 1, where the retarded acid system is free of hydrophobic organic alcohols.

* * * * *

UNITED STATES PATENT AND TRADEMARK OFFICE
CERTIFICATE OF CORRECTION

PATENT NO. : 10,703,957 B2  
APPLICATION NO. : 16/039525  
DATED : July 7, 2020  
INVENTOR(S) : Al-Yami et al.

Page 1 of 1

It is certified that error appears in the above-identified patent and that said Letters Patent is hereby corrected as shown below:

On Page 5, Column 1, item (56), other publication, cite no. 2, delete "Office Action dated Feb. 11, 2019 pertaining to U.S. Appl. No. 15/920,879, filed Mar. 14, 2018, 38 pgs." and insert --Office Action dated Feb. 11, 2019 pertaining to U.S. Appl. No. 15/920,879, filed Mar. 14, 2018, 68 pgs.--, therefor.

Signed and Sealed this
Fifteenth Day of September, 2020

Andrei Iancu
*Director of the United States Patent and Trademark Office*